(12) United States Patent
Krejcarek

(10) Patent No.: US 12,170,548 B2
(45) Date of Patent: Dec. 17, 2024

(54) SERIALIZATION WITH WIRELESS LABELS

(71) Applicant: Reelables, Inc., Seattle, WA (US)

(72) Inventor: Brian Grant Krejcarek, London (GB)

(73) Assignee: Reelables, Inc., Seattle, WA (US)

( * ) Notice: Subject to any disclaimer, the term of this patent is extended or adjusted under 35 U.S.C. 154(b) by 203 days.

(21) Appl. No.: 17/880,568

(22) Filed: Aug. 3, 2022

(65) Prior Publication Data

US 2024/0048181 A1    Feb. 8, 2024

(51) Int. Cl.
*H04B 5/72* (2024.01)
(52) U.S. Cl.
CPC ........................................ *H04B 5/72* (2024.01)
(58) Field of Classification Search
CPC .................................... H04B 5/72; H04B 5/77
USPC ....................................................... 455/41.1
See application file for complete search history.

(56) References Cited

U.S. PATENT DOCUMENTS

| | | | | |
|---|---|---|---|---|
| 2018/0150731 A1* | 5/2018 | Bryan | .............. | G06K 19/06028 |
| 2022/0058984 A1* | 2/2022 | Ambartsoumian | ....... | B65C 3/08 |
| 2022/0318724 A1* | 10/2022 | Eagleson, Sr | ....... | G06Q 10/087 |
| 2023/0177458 A1* | 6/2023 | Kim | ....................... | G06V 10/82 |
| | | | | 705/28 |

* cited by examiner

*Primary Examiner* — Eugene Yun
(74) *Attorney, Agent, or Firm* — Cognition IP, P.C.; Edward Steakley; Saleh Kaihani

(57) ABSTRACT

Various product serialization systems can be integrated with thin-film wireless label technology. At the time of activating a thin-film wireless label, a wireless transmitter identifier can be associated with an existing serialization code, allowing the thin-film wireless label and the serialization code to be linked in an item tracking system. In some embodiments, a thin-film wireless label can be manufactured with a trace layer below the printable area of the label. The trace layer connected to a microcontroller in the thin-film wireless label can be used to capture an induction signal generated in the trace layer during thermal printing of a serialization code on the thin-film wireless label. The induction signal can be used to construct a representation of the serialization code. The representation can be associated with the thin-film wireless label, stored, and otherwise used in tracking an item to which the thin-film wireless label is attached.

10 Claims, 6 Drawing Sheets

SERIALIZATION WITH WIRELESS LABELS

BACKGROUND

Field

This invention relates generally to the field of thin-film wireless labels, and more particularly to smart wireless labels and wireless labels integrated in an existing product or shipment serialization infrastructure.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Wireless labels have substantially contributed to the field of inventory, shipment, and item tracking. Integration of modern wireless label technology into existing inventory and shipment systems can increase the usefulness of wireless label technology by several folds. In particular, existing inventory and shipment infrastructures utilize bar codes, quick response (QR) codes and similar serialization schemes that can benefit substantially from improved integration with wireless label technology. Such wireless labels can be effectively used in several fields, including in shipment, inventory tracking and many more applications.

SUMMARY

The appended claims may serve as a summary of this application.

BRIEF DESCRIPTION OF THE DRAWINGS

These drawings and the associated description herein are provided to illustrate specific embodiments of the invention and are not intended to be limiting.

DETAILED DESCRIPTION

Figure 1:
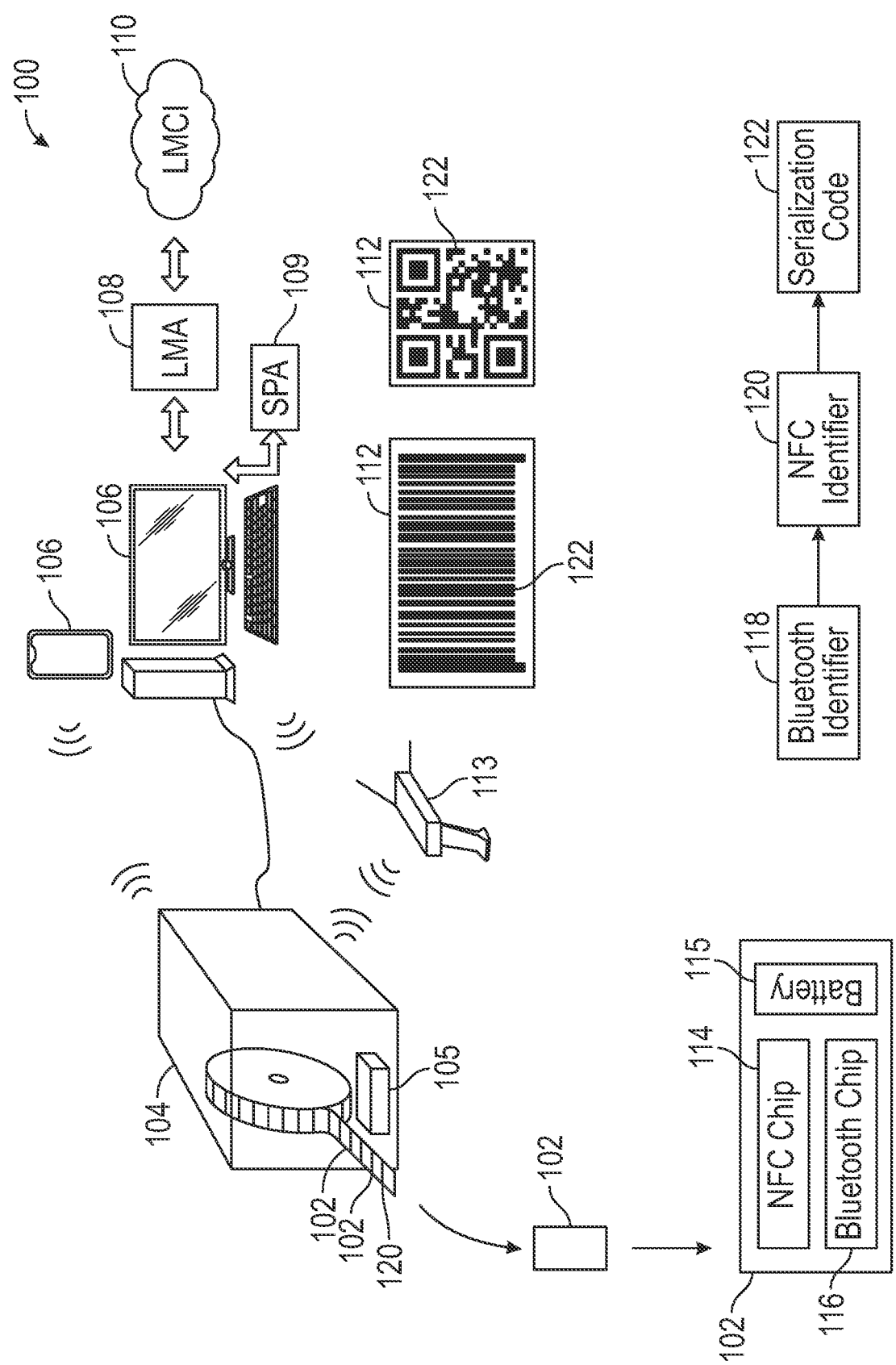
FIG. 1 illustrates an example embodiment of a serialization system enhanced with using wireless labels.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Companies that maintain inventory, ship products, manufacture goods, or otherwise handle physical items in the course of business activities in most cases have existing infrastructures for tracking items. Their systems typically use some form of serialization in a computerized inventory or shipment tracking environment. Serialization aims to provide for a unique numbering methodology to track each item of inventory or shipment. Example serialization techniques include using product stock keeping unit (SKU) numbers, part number (PN), lot or serial numbers, and tracking or waybill numbers. To identify an item, typically a physical label, bearing a print-out of a serialization scheme is applied to the item. Familiar examples include application of barcodes or more recently application of QR codes to the items or items' external packaging. In other words, serialization systems often are implemented in the form of physical labelling, in which serialization software systems communicate with databases and label printers to produce unique labelling for shipments or inventory tracking. For example, barcodes can be used as printed labels, which can in turn use various encoding mechanisms embedded into the width and spacing of the lines in a barcode to encode various product and product tracking information.

Modern businesses often invest significant resources in establishing and customizing their product tracking systems (e.g., warehouse management systems) to manage their inventory, and often take advantage of some form of serialization, such as barcodes, QR codes and the like. Product tracking systems also in many cases have to interface with other product tracking systems used by customers, suppliers, shippers, and external partners. For instance, when a hospital acquires a stock of medical devices or equipment, such devices and equipment arrive at the hospital pre-labeled with a supplier's serialization scheme (e.g., part number, barcode, etc.). The hospital may wish to re-label the inventory with its own asset tracking and product tracking serialization system. In another example, a shipping company may provide a proprietary tracking number that may need to be associated with an internal order number. In these and similar instances of using a serialization methodology, integrating with disparate serialization systems, and changing one's systems to accommodate additional associations, are often a time-consuming and an expensive software development project, involving coding, testing, and redeploying inventory and tracking systems. Therefore, a solution for seamlessly or efficiently combining two or more serialization systems, with reduced or minimal integration work, in a way that does not require a company to change their existing business practices or workflows can be of great benefit.

Furthermore, wireless technologies, such as radio frequency identification (RFID), near-field communication (NFC), Bluetooth and the like can be integrated with various serialization systems and substantially increase the usefulness, efficiency and tracking ability of serialization systems. For example, a serialization label, enhanced with wireless capabilities, can encode additional information about the item to which the label is affixed. The label can broadcast certain information about the item, location, or other characteristics of the label and/or the item. However, a challenge with integrating wireless label technology with existing serialization can lie in the fact that the manufacturing of wireless labels is a separate process than the process of deploying the wireless label in an inventory, shipment, or serialization system. The applicability of the wireless label technology can be substantially increased if businesses can purchase wireless labels and use them, as they would use ordinary, non-wireless labels. For example, businesses likely prefer to be able to purchase wireless labels and use them with the business's existing inventory software and printing services, without having to deploy complex backend integration to merge the two serialization schemes with one another.

Wireless labels may be manufactured in reels and sold in bulk quantities to customers. Some wireless labels can include circuitry to encode various information. For example, RFID-based and/or NFC-based wireless labels can be implemented without a battery, where a reader (typically external to the wireless label) can be used to scan and read stored information from the wireless label. Another type of wireless label may include wireless technology, such as Bluetooth, which takes advantage of a battery integrated in the wireless label. A battery powered wireless label can offer advantages that may be absent in non-battery-powered wireless labels. For example, battery-powered wireless label can include an ability to broadcast certain information to be picked up by a receiver, such as a smart phone, tablet or other external receiver device, equipped with a wireless receiver compatible with the wireless transmitter of the label. One challenge to wide-spread adoption of battery-powered wireless labels can be in the difficulty of manufacturing battery-powered wireless labels in a form-factor and cost ratio that is small and thin enough to be used in a similar fashion as an ordinary paper label with an adhesive layer. Examples of thin-film wireless labels that overcome such challenges and enable battery-powered wireless labels in a convenient form-factor at a cost-effective ratio are described in the U.S. Pat. No. 10,964,197, dated Mar. 30, 2021, titled, "LOW-POWER ELECTRONIC TAPE FOR TRACKING ITEMS," the contents of which are hereby incorporated in their entirety and should be considered a part of this disclosure.

To conserve battery in a wireless label, these labels are put in hibernation mode when manufactured and are left to the end user/customer to activate them into an active state when they are ready to be used. This process can be referred to as waking up the wireless label at the provisioning time. In some embodiments, the provisioning can be performed by a variety of techniques, including a process that occurs during the printing process of a serialization code on a surface of a label face stock. Examples of such printing processes can include printing processes that use thermo-chromatic materials and those which accept ink from thermal transfer ribbons. In some embodiments, a user can receive a reel of thin-film wireless labels that are in hibernation state. A dispenser/printer can connect to a label management application (LMA), and in combination with the LMA can print or dispense a wireless label. Printing or dispensing at the provisioning stage can include printing various information on the wireless label, including a serialization code, text, and/or other information. The dispenser/printer can also activate a wireless label as part of dispensing or printing the label from a reel of wireless labels. The non-dispensed wireless labels can remain in hibernation state.

FIG. 1 illustrates a serialization system 100 enhanced with using a wireless label 102. The system 100 can provide a user with a reel of wireless labels 102. The reel can be inserted in a dispenser 104. The user can be an employee in a warehouse, a shipping or receiving center, or any individual that can use the system 100 to track items and associate items with a serialization code. The wireless labels 102 can be thin-film, battery-powered wireless labels. The wireless labels 102 can include one or more wireless technology, including for example, a Bluetooth chip, processor, microcontroller, or microprocessor 116, an NFC chip 114, and a battery layer 115 among other components. The thin-film wireless label 102 may include its components in two or more layers sandwiching one another. As described earlier, not every component in every wireless label 102 is necessary, or some components may be combined into one. For example, some Bluetooth chips 116 can include several other components, such as an NFC chip 114 (integrated in the same microprocessor), a wake-up port, an analog to digital converter (ADC) and other components. Some wireless labels 102 can include cellular network transmitters and/or transceivers for connecting to cellular wireless networks. While some embodiments will be described in relation to the operations of a Bluetooth circuit, such as the Bluetooth chip 116, the described technology can be applied to wireless labels having cellular or other wireless technologies. At the time of manufacturing of the wireless label 102, the Bluetooth chip 116 is placed in hibernation or inactive state. Once a voltage is received at a wake-up port, the Bluetooth chip transitions to the active state and begins executing its functions and programs.

The dispenser 104 can be a label printer, such a thermal label printer or other kinds of printers, for example those using ink, inkjet or laser printing techniques. When dispenser 104 is a thermal printer, a thermal printing head creates lines and dots on a medium (such as the top surface of a wireless label 102) by generating heat. The reel of labels 102 can be manufactured to fit in the dispenser 104, in the same manner as the dispenser 104 may accept other printing media. In other words, the form factor of the reel and the wireless labels 102 in the reel include a thickness appropriate for traveling through the mechanical components of the dispenser 104 and lend themselves to being used as printing media in the dispenser 104. The dispenser 104 may work in conjunction with a serialization printing application (SPA) 109, from which a user can adjust alignment and other printing parameters to use the dispenser 104 to print a serialization code on a wireless label 102. The dispenser 104 can interface with a mobile or stationary computing device 106, such as a desktop, laptop, smartphone, tablet or any other computing device capable of running software and driver applications for the system 100. The computing device 106 can include a microprocessor, a memory, and input/output devices, such as screens, touch screens, keyboards, mice, and the like. The computing devices 106 can interface with the dispenser 104 through wired or wireless connections. The system 100 can include a label management application (LMA) 108, which can have a client-side application component running on the computing devices 106 and a server-side components connected to a label management cloud infrastructure (LMCI) 110. The LMCI 110 can include databases and network components. However, the described embodiments can be implemented in a local and/or cloud-based infrastructure.

The system 100, in some embodiments, can include a scanner, such as a handheld scanner 113. The handheld scanner 113 is not necessary in every implementation but can provide an additional source of input for the system 100. For example, in some embodiments, the functionality of a handheld scanner 113 may be provided by a built-in camera of a computing device 106. The user of the system 100 may have an existing serialization label 112, which can include a serialization code 122. The serialization code 122 can implement a variety of serialization methodologies depending on the existing items, shipment and/or inventory tracking systems of the user of the system 100. Examples of serialization code 122 can include, barcodes, QR codes, SKU numbers, part numbers, lot numbers, serial numbers, tracking numbers, waybill numbers and other serialization codes. The system 100 can receive a serialization code 122 and associate the serialization code 122 with internal wireless identifiers of a wireless label 102. The LMA 108 and/or the LMCI 110 can store the mappings between the serialization codes 122 and the wireless identifiers of a wireless label 102.

As described earlier, the wireless label 102 can include one or more wireless components, such as a Bluetooth chip 114 and an NFC chip 114. These chips each include a wireless circuit identifier. For example, the Bluetooth chip 116 can include a Bluetooth identifier 118. An example of a Bluetooth identifier 118 can be the media access control (MAC) address of the Bluetooth chip 116 or any other unique identifier for a wireless transmitter of the Bluetooth chip 116 to identify itself. Similarly, the NFC chip 114 can have an NFC identifier 120. During the manufacturing of the wireless label 102, a mapping of an association between a Bluetooth identifier 118 and an NFC identifier 120 can be stored in a database, such as a database in the LMCI 110. Before provisioning or activating a wireless label 102, there is no stored association between the Bluetooth identifier 118 and the serialization 122, as the wireless label 102 is manufactured without any association with an external serialization scheme of any particular user of the system 100. Similarly, before provisioning, there is no stored association between the NFC identifier 120 and any serialization 122. However, at the time of manufacturing, the manufacturer of a wireless label 102 can store an association or mapping between a Bluetooth identifier 118 and an NFC identifier 120 of a wireless label 102, as these parameters are known to the manufacturer at the time of the manufacturing of a wireless label 102.

In some embodiments, during provisioning or activation of a wireless label 102, the association between the Bluetooth identifier 118 and the NFC identifier 120 for that label is detected and augmented, by storage in a database, with a secondary association and mapping to a serialization code 122 provided by a user of the system 100. The mappings and associations between the identifiers 118, 120 and 122 can be stored in the LMCI 110 and increase the functionality of the wireless label 102. In some embodiments, the manufacturer of the wireless labels 102 can write an NFC identifier 120 to the NFC chip 114 during the manufacturing of the wireless label 102. In other embodiments, the NFC chip 114 can include an internal identifier stored and readable from the NFC chip 114. In this and other scenarios, the administrator of the system 100 has access to the mapping and association of the Bluetooth identifier 118 corresponding to the NFC identifier 120 for a wireless label 102.

In some embodiments, the dispenser 104 can include an NFC reader 105. The NFC reader 105 can be mounted in a position to be in a distance suitable for reading the NFC chip 114 in a wireless label 102. This can include a distance within a few centimeters of the NFC chip 114. The NFC reader 105 can induce a voltage on the NFC chip 114, via a radio frequency (RF) field and read the stored NFC identifier 120 from the NFC chip 114. The NFC identifier 120 can be conveyed to the LMA 108. The LMA 108 can query the LMCI 110 to look up a mapping of the NFC identifier 120 with a corresponding Bluetooth identifier 118. In other embodiments, the Bluetooth identifier 118 corresponding to an NFC identifier 120 can be stored on the wireless label 102, as part of payload of the NFC chip 114 and/or the Bluetooth chip 116. In case of storage of the mapping between the Bluetooth and NFC identifiers 118 and 120 in the wireless label 102, the induced voltage via an RF field from the NFC reader 105 may be used to wake up the Bluetooth chip 116 and access the data payload storing the mapping. In this manner, when the LMA 108 receives a serialization code 122 to associate with a wireless label 102, it can associate the serialization code 122 with the NFC identifier 120 of the wireless label 102 and a corresponding Bluetooth identifier 118 of the wireless label 102. In some embodiments, the receiving of a serialization code 122 and activating a wireless label 102 can include associating the serialization code 122 with the NFC identifier 120 and the Bluetooth identifier 118 of a wireless label 102 and transitioning the wireless label 102 to an active state.

Figure 2:
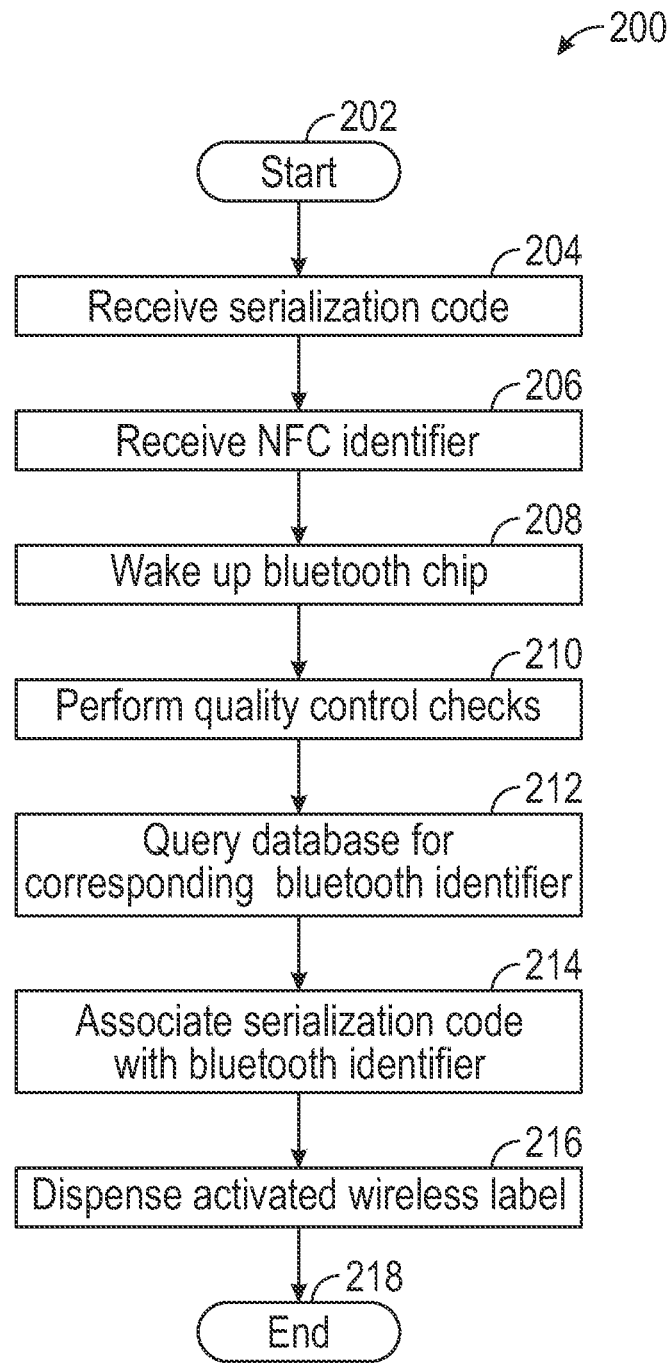
FIG. 2 illustrates an example embodiment of a method of provisioning a wireless label that includes associating one or more wireless identifiers with an existing serialization code.

FIG. 2 illustrates an example method 200 of provisioning a wireless label 102 that includes associating a Bluetooth identifier 118 and an NFC identifier 120 of the wireless label 102 with an existing serialization code 122. The method starts at step 202. At step 204, a serialization code 122 is received. The step 204 can be performed in a variety of ways. In one example, the LMA 108 can interface with the handheld scanner 113 and receive as input a serialization code 122. In other embodiments, the LMA 108 can receive a serialization code 122 from the camera of a computing device 106, which can include the computing device 106, which runs or executes the LMA 108. The LMA 108 can interface with the dispenser 104 and can trigger the dispenser 104 to dispense, print and/or provision a wireless label 102. At step 206, the NFC reader 105 can induce a voltage on the NFC chip 114 and read an NFC identifier 120 from the NFC chip 114. The NFC identifier 120 is conveyed to the LMA 108. At step 208, the Bluetooth chip 116 is woken up, activated, or transitioned from hibernation state to active state. Activating the wireless label 102, and the Bluetooth chip 116, can be accomplished in a variety of ways, for example by inducing a voltage on the wake-up port of the Bluetooth chip 116. In some implementations, the wake-up voltage at the wake-up port is provided by the NFC chip 114 from the voltage induced, via an RF field, by the NFC reader 105 embedded in the dispenser 104. The wake-up voltage can be provided by other means, such as by receiving a mutually induced voltage from an electromagnetic field (EMF) generated by a component of the dispenser 104 (e.g., a motor's initial rotation to move the reel can provide a pulse of EMF to generate a wake-up voltage).

The wireless label 102 and/or the LMA 108 can perform a variety of quality control checks to determine the field-readiness of an activated wireless label 102 and whether to proceed with using the activated label. At step 210, the wireless label 102 and/or the LMA 108 can perform quality control checks. If the wireless label 102 passes the quality control checks, the wireless label 102 is considered a good label and the method can proceed. Otherwise, the steps 204-208 can be repeated for another wireless label 102. An example quality control check is a checksum test. Another example test includes testing whether the wake-up process of the wireless label 102 functioned properly, and whether the label is activated. A Bluetooth listening device can be used to detect whether a post-wake-up signal is being received from the wireless label 102. If the post-wake-up signal can be detected the wireless label 102 is activated. If not, the step 208 can be repeated on the same label. If the wireless label 102 cannot be activated, after a selected number of attempts, the steps 204-210 can be repeated for a different wireless label 102.

At step 212, the LMA 108 can query the resources at the LMCI 110 to determine a Bluetooth identifier 118 corresponding to the NFC identifier 120. The corresponding Bluetooth identifier 118 refers to the identifier of the Bluetooth chip 116 that is on the same label as the NFC chip 114 received or detected at the step 206. At step 214, the Bluetooth identifier 118 can be associated with the serialization code received at the step 204. The association or the mapping between the Bluetooth identifier 118 and the serialization code 122 can be stored as a database entry in one of the resources of the LMCI 110. In other embodiments, the association between the serialization code 122 and the Bluetooth identifier 118 can, additionally or instead, be stored in the wireless label 102, as part of the payload of the Bluetooth chip 116. In other words, the NFC identifier 120 acts an intermediary to detect the Bluetooth identifier 118 and store an association between the Bluetooth identifier 118 and the serialization code 122. The association between the Bluetooth chip 116 of the wireless label 102 and the serialization code 122 can be used in a variety of ways, when managing the wireless label 102. The wireless label 102 activated in the manner described in the method 200 can carry information about an item to which the wireless label 102 is applied. At step 216, the dispenser 104 dispenses the activated wireless label 102. Dispensing can include printing the serialization code 122 on the activated wireless label 102 and ejecting the wireless label 102 from the dispenser 104. The method ends at step 218.

While the described embodiments are explained in terms of the Bluetooth chip 116, other wireless technologies can also be used. For example, a cellular network wireless circuit can be used. Examples include, 5G, NB-IoT, LTE-M or others. In these scenarios, the provisioning process can include installing an e-SIM or wireless cellular profile into the wireless label 102. Furthermore, the stored association can include associating a cellular wireless profile with the serialization code 122.

The LMA 108 can be configured to implement workspaces when provisioning wireless labels 102. Workspaces can be allocated based on selected criteria, such as the type and category of the serialization code 122, location of the dispenser 104, such as zoning (including within a single customer site). The workspaces can be further customized in terms of user permissions and access restrictions to increase the security of an inventory item associated with the wireless label 102.

In some embodiments the dispenser 104 includes a thermal printing head, which can interface with the LMA 108 and/or the SPA 109 to print a serialization code on a surface of a wireless label 102. The dispenser 104 can accept wireless labels 102 (or a reel of them), where the labels have an external surface sensitive to heat. The thermal printing head selectively generates heat by running a current through a resistive element. The heat creates an impression on the printable surface of a label. This technique can be used to print various serialization codes 122, such as barcodes, QR codes or the like. In the case of the barcode, the duration and location of applying a current to a resistive element are also modulated to print bars of various widths on the label. In other words, the duration of an ON signal through a resistive element can correspond to the width of an individual line of a barcode. In other words, the ON time durations of the current signal through the resistive element of a thermal printing head can correspond to the width of an individual line in a barcode.

In some embodiments, the wireless label 102 can include a metal trace layer underneath and parallel to the thermal printing head. The current traveling through a resistive element in the thermal printing head can also induce an inductive current in the trace layer, which can be used to detect a signal corresponding to the serialization code 122 being printed on the wireless label 102.

Figure 3:
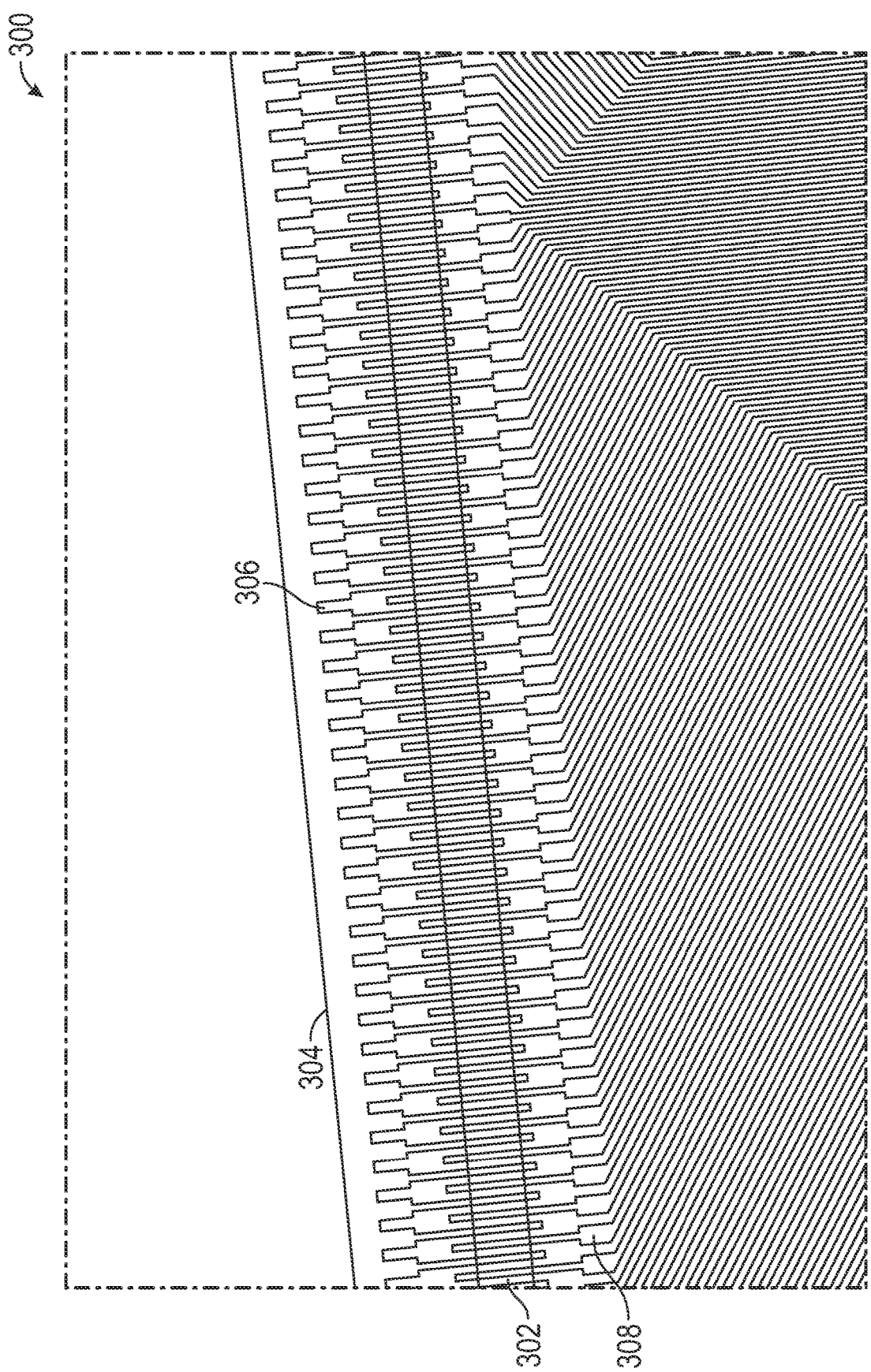
FIG. 3 illustrates an example diagram of the arrangement of a selection of components in a thermal printing head according to an embodiment.

FIG. 3 illustrates an example diagram 300 of the arrangement of a selection of components in a thermal printing head, according to an embodiment. A heating element 302 is connected to a ground rail 304 with ground connection lines or ground traces 306. The heating element 302 is also connected to signal traces 308, via which a current can be applied to the heating element 302. The electrical path formed by the signal traces 308, the heating element 302, the ground traces 306 and the ground rail 304 forms a resistive heating element, which can create an impression on the surface of a label close to this path. The impression is a printed pixel, or a series of pixels, based on the period of time of current flow through a heating element 302 and the ejection speed of the printing process. The heat generated from the resistive heating element 302 reacts with a thermochromatic label material or a thermal ribbon over the label face stock and generates the impression. By selectively choosing signal and/or ground traces 308, 306, the impression created on the surface of the label can be modulated, for example, lines and dots of various widths can be printed on the surface of the label. The changing current generated in the circuits in the diagram 300 can induce a current in a trace layer in a wireless label 102, via mutual inductance. The induced current can be detected by an analog to digital converter (ADC) and the microprocessor in a wireless label 102.

The Wireless Label 102 and the Payload Delivered to Listening Devices

Figure 4:
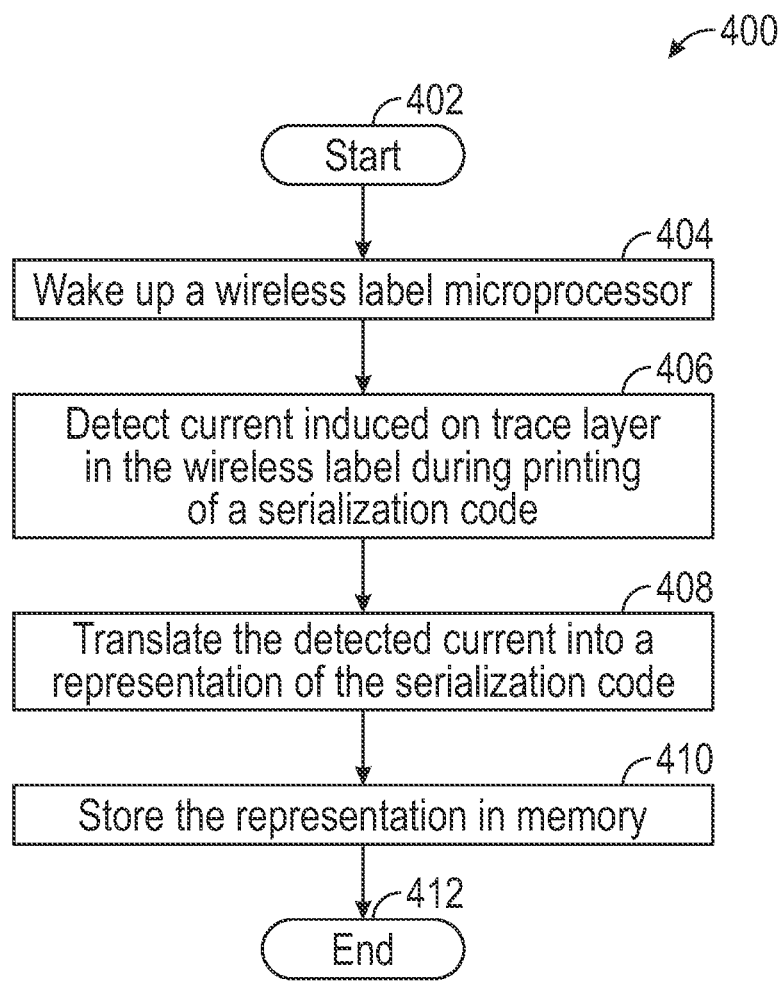
FIG. 4 illustrates a flowchart of an example embodiment of a method by which a wireless label can detect a serialization code printed on its surface.

FIG. 4 illustrates a flowchart of a method 400 of a wireless label 102 detecting a serialization code 122, which is printed on a surface of the wireless label 102. The method 400 can be used with wireless labels 102, which include a trace layer, from which a mutually induced current from a thermal printing head can be detected. The method starts at step 402. At step 404, the wireless label 102 can be activated or awaken, by for example, providing a wake-up voltage at a wake-up port of the microprocessor embedded in the wireless label 102. The microprocessor of the wireless label 102 can also include wireless transmitters, analog to digital converters (ADCs) or other components. A variety of methods can be used to generate the wake-up voltage at the wake-up port of the microprocessor. For example, the wake-up signal can be generated by a pulse of mutual induction current sensed at the wake-up port of the microprocessor as a result of an initial printed pixel, such as a header printed on a barcode label. The wake-up signal could also be generated from a pulse of electromagnetic field (EMF) energy due to the initial movement of a motor inside the dispenser 104 (e.g., the motor that advances a wireless label 102 through the components of the dispenser 104). In another embodiment, the wake-up voltage can be provided by an NFC circuit, which can be configured to wake up the microprocessor of the wireless label 102 upon receiving a mutually induced current, for example, any current generated as a result of the printing process initiating or printer components receiving a current as they initiate and/or perform their functions.

At step 406, the microprocessor can detect a mutual induction signal on the trace layer of the wireless label 102. As the thermal printing head switches the load on various signal traces 308, mutual inductance, generates a current on the trace layer of the wireless label 102, which the microprocessor can detect. In some cases, the thermal printing head may switch an alternating current (AC) and further modulate the AC signal using pulse width modulation (PWM) techniques to control the temperature and printing intensity of a serialization code 122, based on user received inputs, relating to dithering, grayscale, and intensity of the printed serialization code 122. Switching the resistive and/or inductive loads generated in the thermal printing head induces a mutually varying current on the trace layer of the wireless label 102, which can be detected. Both pixel-based switching and PWM dithering effects can induce mutual inductance currents in the trace layer of the wireless label 102, which can be used to construct a presentation of a serialization code being printed by the thermal printing head.

At step 408, the detected mutual induction current on the trace layer of the wireless label 102 is translated into a representation of the serialization code printed on the surface of the wireless label 102. Various methods of representation can be used. For example, the mutual inductance current can be translated into a series of numbers. In some embodiments, the Bluetooth microprocessor on the wireless label 102 includes an analog to digital converter (ADC), which can be used in detecting at the step 406 and/or translating the detected current to a representation at the step 408. At step 410, the representation of the serialization code 122 is stored in a memory device in the wireless label 102 and/or the LMCI 110. When the representation is stored on a memory device in the wireless label 102, the label acts as a smart label. In other words, the label includes the information of an item to which the label may be applied and can broadcast the information. The item information received from the wireless label 102 can be used in a variety of item tracking, shipment and inventory applications and other item management scenarios. The method ends at step 412.

Figure 5:
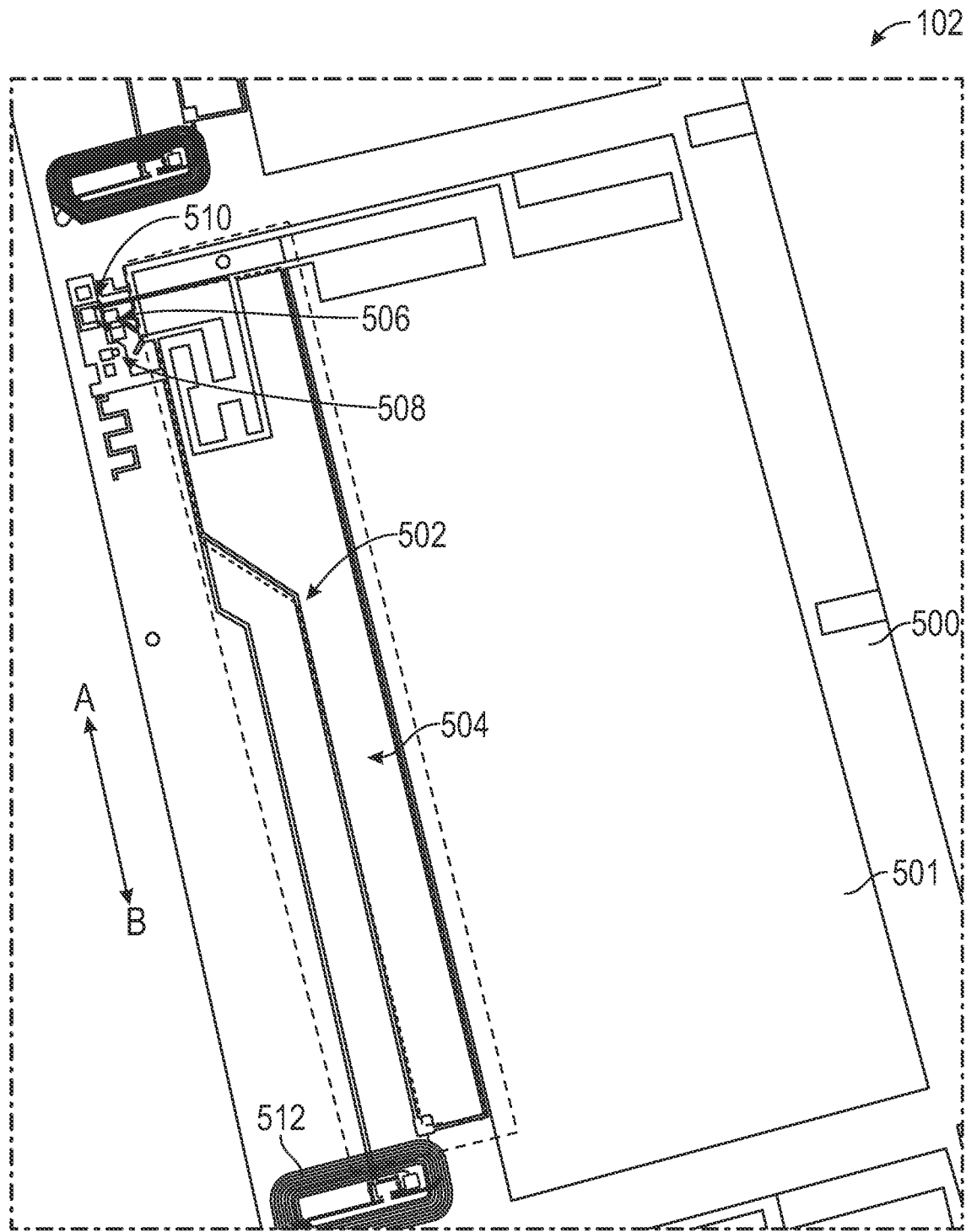
FIG. 5 illustrates a diagram of an example wireless label with a trace layer.

FIG. 5 illustrates a diagram of an example wireless label 102 with a trace layer 502. The wireless label 102 is built on a thin-film substrate 500, upon which various layers are stacked and sandwiched to provide wireless and other functionality for the wireless label 102. A battery layer 501 is also shown. The wireless label 102 can include a trace layer 502 positioned in the label relative to the direction of travel of the wireless label 102 in the dispenser 104 and its thermal printing head, in a manner to accept a mutually induced signal in the trace layer 502, as the dispenser 104 prints a serialization code 122 on the wireless label 102. In some embodiments, the trace layer 502 is arranged parallel to the direction of travel of media in the thermal printer head in a manner that the trace layer 502 is substantially directly below the printable area of a two-dimensional serialization code 122. In this arrangement, the dispenser 104 prints the serialization code 122 parallel to the direction of travel of media (e.g., a roll of wireless labels 102) through the dispenser 104. The positioning of the printed serialization code 122 can be adjusted in a layout program, including for example, in the functionality provided by the SPA 109. In the example shown, the trace layer 502 is arranged in a manner that it encompasses a printable area 504 above or below which the thermal printing head of the dispenser 104 can print a serialization code 122 in the direction of media travel A-B or B-A. In this arrangement, a mutually induced current can be generated in the trace layer 502 and be detected. In the embodiments of FIGS. 4 and 5, the dispenser 104 can, but need not to, include an NFC reader.

The wireless label 102 can also include an ADC 506 connected to the trace layer 502. The ADC 506 can detect or receive the mutually induced signal on the trace layer 502, convert it to a digital stream and convey it to a microcontroller unit (MCU) 508. In some embodiments, the MCU 508 is the same as the microprocessor of the wireless label 102, and depending on implementation, can include a plurality of functionality. For example, the MCU 508 can include a wireless transmitter (Bluetooth, cellular, etc.). In other embodiments, the ADC 506 can be an internal component of the MCU 508. The MCU 508 can also include one or more general-purpose input/output (GPIO) ports, one of which can be used to receive a wake-up signal. In the example shown, a GPIO port 510 is shown. In some embodiments, a GPIO port can be used to receive a wake-up signal from the ADC 506. In other embodiments, a GPIO port can be used to receive a wake-up signal from an NFC circuit 512. Various interactions of the dispenser 104 and/or its components at the beginning or during the printing process can generate a signal on either the ADC 506, or the NFC circuit 512, which can be utilized to wake up the MCU 508.

A thermal printing head can induce a mutual inductance current or voltage on the trace layer 502. A thermal printing head operates by creating tiny pixel-sized bursts of heat which cause a thermochromic change in the chemistry of a surface of a wireless label 102, for example, resulting in a black dot on a white background. As thermochromic material moves through the thermal printing head, an image, such as a barcode can be printed on the thermochromic material. Operating using the circuits illustrated in the diagram 300, a thermal printing head creates pixelized heat patterns by quickly switching ON and OFF, the pulses of current to form miniature heating elements, with a resistive load connected to ground. Switching ON/OFF the currents in the resistive elements generates electromagnetic field (EMF) resulting in a mutual induction current or voltage in the trace layer 502, which can be detected to generate a corresponding representation of the serialization code 122 being printed on the wireless label 102.

Capturing a Mutually Induced Signal and Translating the Signal to a Representation The ADC 506 produces measurements during the printing of a serialization code 122 on a wireless label 102. In the case of a barcode, the ADC 506 measurements can have a start signal and an end signal corresponding, respectively, to the beginning and the end of when the dispenser 104 starts and finishes printing a single bar in a barcode.

Figure 6:
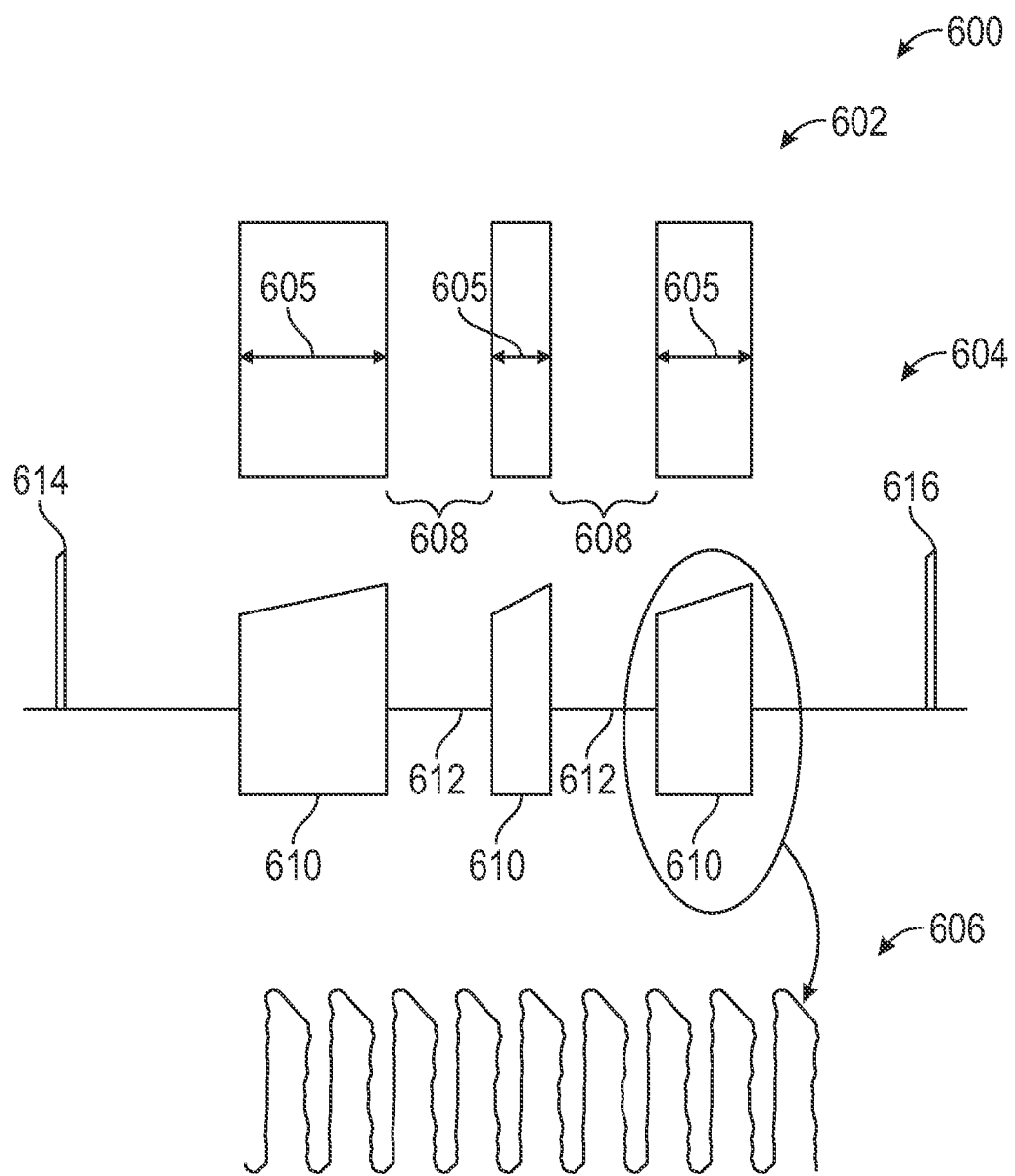
FIG. 6 illustrates a diagram of a serialization code and associated signals generated on a wireless label, according to an embodiment.

FIG. 6 illustrates a diagram 600 of a serialization code 602 and associated signals generated on a wireless label 102, according to an embodiment. The serialization code 602 is sent to a dispenser 104. The dispenser 104 includes a thermal printing head, which can print the serialization code 602 on a wireless label 102. The wireless label 102 in this example includes one or more trace layers 502. The dispenser 104 prints the serialization code 602 using the circuits described in the diagram 300. The mutual induction signal 604 generated on the trace layer 502 is detected by the ADC 506 and is used to conduct measurements. The mutual induction signal 604, detected by the ADC 506 can include mutual induction voltages and/or currents which can be used to construct a representation corresponding to the serialization code 602.

The thermal printing head produces the serialization code 602 by sending a PWM signal to the heating element 302, illustrated in the diagram 300. This is to control the temperature of each pixel. For example, a higher duty cycle of the PWM signal sent to the heating element 302 means a hotter heating element, which leads to a darker pixel. By modulating the duty cycle of the PWM signal, the dispenser 104 can create dithering effects. Dithering effects refer to the ability of the dispenser 104 to produce grayscale images and/or pixels. Using PWM also prevents burn outs in the circuits in the diagram 300. As PWM generates an oscillating and alternating current (AC), a mutual induction signal due to the PWM signal is produced on the trace layer 502. The diagram 600 shows a PWM signal 606. The PWM signal 606 is the zoomed-in version of the mutual induction signal 604, which illustrates the PWM dithering effects on the top edges of the PWM signal 606. The MCU 508 can detect the signal 604, 606 from the trace layer 502 via the ADC 506.

In one example, a correspondence can be found between the ON periods of the mutual induction signal 604 and the widths of the bars in the serialization code 602. As illustrated in the diagram 600, the ON periods 610 in the induction signal 604 can correspond with the widths 605 of the serialization code 602, and the OFF periods 612 in the induction signal 604 can correspond with the spacings 608 in the serialization code 602. The mutual induction signal 604 also includes a wake-up induction signal 614, which can be generated via an EMF pulse generated by a motor of the dispenser 104 at the beginning of the printing of the serialization code 602, as the motor advances a wireless label 102 through the dispenser 104 for printing. The wake-up induction signal 614 can also serve as a start signal for the MCU 508 to begin recording ADC 506 measurements for the serialization code 602. An end signal 616 can also be generated and detected in the same manner via an EMF pulse generated by the motor when the motor stops moving the wireless label 102 through the dispenser 104. Detecting an end signal 616 can indicate to the MCU 508 that a serialization code 602 has finished printing and the MCU 508 can stop recording measurements from the ADC 506. In an alternative embodiment, the beginning and end signals can correspond to a selected pattern of printed pixels on the serialization code 602. The selected pattern can be a pattern designed for the purpose of indicating a start/end signal, or it can be a commonly occurring pattern in the beginning/end of the serialization codes 602, as part of the encoding scheme of the serialization code 602.

The ADC 506 measurements that are captured during the printing process can be stored in an array in a random-access-memory (RAM) or other memory device associated with the microprocessor of the wireless label 102 and represent a digital imprint of the serialization code 602 printed on the wireless label 102. The ADC 506 measurements can be processed using various thresholding and/or digital signal processing techniques to reconstruct and/or represent the various components of the serialization code 602. For example, when the serialization code 602 is a barcode, the widths and spacings of the bars and lines of the barcode can be encoded into a series of numbers, characters, zeros and is and/or other identifying string. Alternatively, the MCU 508 can use its wireless transmitter and send the ADC 506 measurements to an external device such as a smart phone or a computing device 106, or via a gateway or access point to a cloud infrastructure, such as the LMCI 110 to be encoded on a local or remote server. In some embodiments, the ADC 506 can be configured to convert the induction signal 604 to a series of 0s and 1s based on the levels of the induction signal 604, relative to a selected threshold.

As described earlier, to represent or encode a serialization code 602, for example into a number string, the widths and spacings between detected pulses, representing bars and lines in a serialization code 602 can be stored on the wireless label 102 and/or the LMCI 110. Alternatively, the final representation may be stored. The widths and spacings can be measured and/or stored in relative terms, but absolute measurements are also possible using a known printed distance between a header marker and tailing marker in a serialization code 602. Alternatively, the measured PWM signal 606 can also be used to establish a timing pattern corresponding to a characteristic of the components of the serialization code 602, such as the width and spacing of the lines and bars in a barcode.

ALTERNATIVE EMBODIMENTS

In one embodiment, the wake-up induction signal 614 is an initial pulse that can indicate the start of printing of a serialization code 602 to be identified and/or represented by the MCU 508 via the ADC 506 measurements of a mutual induction voltage/current induced on the trace layer 502. The wake-up induction signal 614 can originate via a mutual induction from the motor and/or the printing head. The wake-up induction signal 614 can be used to trigger a wake up of the MCU 508 from a low-power sleep state or hibernation state into an active mode, which can cause the MCU 508 to start reading measurements from the ADC 506.

The wake-up functionality may be facilitated with a single trace, which acts both as a GPIO wake up, and then reconfigures as an ADC input after the wake-up. Alternatively, two or more GPIO ports of the MCU 508 can be connected to trace loops and used to form a trace layer 502 in loops to increase the ability of the wireless label 102 to receive mutual inductance signals from the printing process. In other words, additional components, for example in the form of additional loops in the trace layer 502 can create a more robust resonant circuit with improved ability to receive mutual inductance signals. In some embodiments, an NFC circuit 512, or other RFID circuits can also be used to trigger the wake-up process. The signal to trigger the NFC circuit 512 can come from interactions of the wireless label 102 with the components of the dispenser 104, for example from the EMF generated by a motor of the dispenser 104 and/or the EMF generated by the printing head or other electrical or mechanical components of the dispenser 104 during the printing process. The trigger signal for the NFC circuit 512 can also be induced from an NFC or other RFID readers. However, as described earlier, such readers are not needed in every embodiment.

Once a serialization code 602 is represented by the described systems and methods, the representation can be stored, remotely or locally on a server database, a gateway, a mobile device, a cloud infrastructure and/or in a combination of these components. Furthermore, an association or mapping between the representation of the serialization code 602 and one or more wireless identifiers of the wireless label 102 can be stored in a memory of the wireless label 102 and/or external memory devices, such as a local or remote server database. In this manner, an activated wireless label 102 can include a data payload identifying the item to which the wireless label 102 belongs (via the stored mapping between the representation of the serialization code 602 and the wireless identifier).

The representation of the serialization code 602 can be generated based on a numerical string, using any encoding and/or mapping scheme. In one embodiment, when the serialization code 602 is a barcode, the representation can include an encoding scheme, made up of 0s and 1s representing the widths and spacings of the barcode. For example, a bar code can be represented with a string of 0s and 1s, where 0s correspond to the measured spacing (or the OFF periods 612) and 1s correspond to the measured widths (or the ON periods 610). In one embodiment of the invention, the width of the period of the PWM signal 606 may form the reference for this encoding scheme.

EXAMPLES

It will be appreciated that the present disclosure may include any one and up to all of the following examples.

Example 1: A system comprising: a thin-film wireless label comprising a Bluetooth wireless circuit having a Bluetooth identifier, the Bluetooth wireless circuit comprising a microprocessor, wherein the thin-film wireless label further comprises a near-field communication (NFC) circuit having an NFC identifier detectable by an NFC reader, the NFC identifier associated with the Bluetooth identifier of the thin-film wireless label; and a wireless label management module configured to: receive a serialization code associated with an item; receive the NFC identifier from the NFC reader; determine the Bluetooth identifier associated with the NFC identifier; store in a memory device a mapping of the Bluetooth identifier and the serialization code; and identify the item based on the mapping stored in the memory device.

Example 2: The system of Example 1, wherein the microprocessor comprises a wake-up port, the port configured to receive a voltage, and transition the microprocessor from an inactive state to an active state; and wherein the NFC circuit is configured to induce a voltage on the wake-up port upon receiving an induced voltage from the NFC reader.

Example 3: The system of some or all of Examples 1 and 2, wherein the microprocessor is configured to perform quality assurance checks on the wireless label upon receiving a voltage at the wake-up port, and wherein the wireless label management module is configured to store the mapping in the memory device, based at least in part on result of the quality assurance checks.

Example 4: The system of some or all of Examples 1-3, wherein the serialization code comprises barcodes, a QR code, a SKU number, a part number, a lot number, a serial number, a tracking number, or a waybill number.

Example 5: The system of some or all of Examples 1-4, wherein the memory device is integrated in the thin-film wireless label.

Example 6: A system comprising: a thin-film wireless label comprising a Bluetooth wireless circuit, having a Bluetooth identifier, the Bluetooth wireless circuit comprising: a microprocessor; a memory; a trace layer arranged such that printing a serialization code by a thermal printer on the wireless label induces a signal on the trace layer, the induced signal detectable by the microprocessor, wherein the microprocessor is configured to generate a representation of the serialization code based on the induced signal and store the representation in the memory.

Example 7: The system of Example 6, wherein the microprocessor further comprises a wake-up port, wherein the port is configured to receive a voltage, and transition the microprocessor from an inactive state to an active state.

Example 8: The system of some or all of Examples 6 and 7, wherein the wireless label further comprises an analog to digital (ADC) converter, configured to receive the signal and convert the signal to a series of 0s and 1s, based on levels of the signal, relative to a selected threshold.

Example 9: The system of some or all of Examples 6-8, wherein the representation comprises a numerical string.

Example 10: The system of some or all of Examples 6-9, wherein the serialization code is printed on a printable surface area of the wireless label on a layer of the wireless label, wherein the trace layer is arranged in another layer of the wireless label, parallel to the printable surface area layer and substantially overlapping the printable surface.

Example 11: The system of some or all of Examples 6-10, wherein the microprocessor comprises a wake-up port, wherein the port is configured to receive a voltage, and transition the microprocessor from an inactive state to an active state and the received voltage is from an analog to digital converter (ADC) component of the wireless label.

Example 12: The system of some or all of Examples claim 6-11, wherein the microprocessor comprises a wake-up port, wherein the port is configured to receive a voltage, and transition the microprocessor from an inactive state to an active state and the received voltage is from an NFC circuit of the wireless label, wherein the NFC generates the voltage via mutual induction generated due to a current traveling through one or more components of the thermal printer.

Example 13: The system of some or all of Examples 6-12, wherein the thin-film wireless label further comprises an NFC circuit configured to provide a wake-up voltage to the microprocessor.

Example 14: The system of some or all of Examples 6-13, wherein the serialization code comprises a barcode having widths and spaces and the representation comprises bars having widths and separated by spacings, wherein the widths of the representation bars correspond to periods of the induced signal being ON and the spacing between the bars of the representation correspond to periods of the induced signal being OFF.

Example 15: The system of some or all of Examples 6-14, wherein the induced signal is generated by mutual induction from a pulse width modulated signal generated by the thermal printer to supply a current to a resistive circuit in the thermal printer.

Example 16: A method comprising: providing a thin-film wireless label comprising a Bluetooth wireless circuit having a Bluetooth identifier, the Bluetooth wireless circuit comprising a microprocessor, wherein the thin-film wireless label further comprises a near-field communication (NFC) circuit having an NFC identifier detectable by an NFC reader, the NFC identifier associated with the Bluetooth identifier of the thin-film wireless label; receiving a serialization code associated with an item; receiving the NFC identifier from the NFC reader; determining the Bluetooth identifier associated with the NFC identifier; storing in a memory device a mapping of the Bluetooth identifier and the serialization code; and identifying the item based on the mapping stored in the memory device.

Example 17: The method of Example 16, wherein the microprocessor comprises a wake-up port, the port configured to receive a voltage, and transition the microprocessor from an inactive state to an active state; and wherein the NFC circuit is configured to induce a voltage on the wake-up port upon receiving an induced voltage from the NFC reader.

Example 18: The method of some or all of Examples 16 and 17, wherein the microprocessor is configured to perform quality assurance checks on the wireless label upon receiving a voltage at the wake-up port, and wherein the wireless label management module is configured to store the mapping in the memory device, based at least in part on result of the quality assurance checks.

Example 19: The method of some or all of Examples 16-18, wherein the serialization code comprises barcodes, a QR code, a SKU number, a part number, a lot number, a serial number, a tracking number, or a waybill number.

Example 20: The method of some or all of Examples 16-19, wherein the memory device is integrated in the thin-film wireless label.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A system comprising:
    a thin-film wireless label comprising a Bluetooth wireless circuit having a Bluetooth identifier, the Bluetooth wireless circuit comprising a microprocessor,
    wherein the thin-film wireless label further comprises a radio frequency identification (RFID) circuit having an RFID identifier detectable by a reader, the RFID identifier associated with the Bluetooth identifier of the thin-film wireless label; and
    a wireless label management module configured to:
        receive a serialization code associated with an item;
        receive the RFID identifier from the reader;
        determine the Bluetooth identifier associated with the RFID identifier;
        store in a memory device, a mapping of the Bluetooth identifier and the serialization code; and
        identify the item based on the mapping stored in the memory device.

2. The system of claim 1, wherein the microprocessor comprises a wake-up port, the port configured to receive a voltage, and transition the microprocessor from an inactive state to an active state; and wherein the RFID circuit is configured to induce a voltage on the wake-up port upon receiving an induced voltage from the reader.

3. The system of claim 1, wherein the microprocessor is configured to perform quality assurance checks on the wireless label upon receiving a voltage at the wake-up port, and wherein the wireless label management module is configured to store the mapping in the memory device, based at least in part on result of the quality assurance checks.

4. The system of claim 1, wherein the serialization code comprises barcodes, a QR code, a SKU number, a part number, a lot number, a serial number, a tracking number, or a waybill number.

5. The system of claim 1, wherein the memory device is integrated in the thin-film wireless label.

6. A method comprising:
    providing a thin-film wireless label comprising a Bluetooth wireless circuit having a Bluetooth identifier, the Bluetooth wireless circuit comprising a microprocessor,
    wherein the thin-film wireless label further comprises a radio frequency identification (RFID) circuit having an RFID identifier detectable by a reader, the RFID identifier associated with the Bluetooth identifier of the thin-film wireless label;
    receiving a serialization code associated with an item;
    receiving the RFID identifier from the reader;
    determining the Bluetooth identifier associated with the RFID identifier;
    storing in a memory device a mapping of the Bluetooth identifier and the serialization code; and
    identifying the item based on the mapping stored in the memory device.

7. The method of claim 6, wherein the microprocessor comprises a wake-up port, the port configured to receive a voltage, and transition the microprocessor from an inactive state to an active state; and wherein the RFID circuit is configured to induce a voltage on the wake-up port upon receiving an induced voltage from the reader.

8. The method of claim 6, wherein the microprocessor is configured to perform quality assurance checks on the wireless label upon receiving a voltage at the wake-up port, and wherein the wireless label management module is configured to store the mapping in the memory device, based at least in part on result of the quality assurance checks.

9. The method of claim 6, wherein the serialization code comprises barcodes, a QR code, a SKU number, a part number, a lot number, a serial number, a tracking number, or a waybill number.

10. The method of claim 6, wherein the memory device is integrated in the thin-film wireless label.

* * * * *